Figure 1:
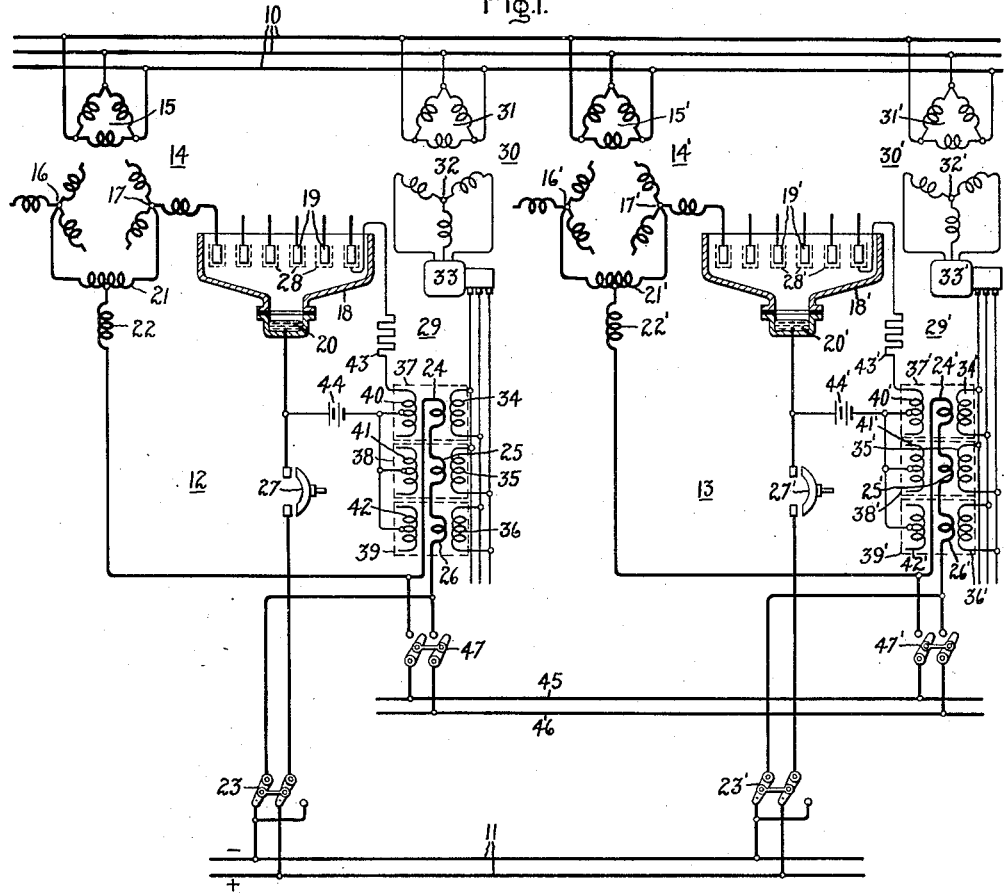

June 17, 1941.    C. C. HERSKIND    2,246,173
ELECTRIC VALVE CONVERTING SYSTEM
Filed Oct. 3, 1939

Inventor:
Carl C. Herskind,
by Harry E. Dunham
His Attorney.

Patented June 17, 1941

2,246,173

UNITED STATES PATENT OFFICE 2,246,173

ELECTRIC VALVE CONVERTING SYSTEM

Carl C. Herskind, Schenectady, N. Y., assignor to General Electric Company, a corporation of New York Application October 3, 1939, Serial No. 297,694

9 Claims. (Cl. 175—363)

My invention relates to electric valve converting systems and more particularly to a control system for insuring load division between parallel operated electric valve devices of the type which are provided with means for compensating for natural regulation.

In the operation of electric valve converting apparatus it has been found desirable from the standpoint of economical construction, efficiency of operation and reliability of service to divide the apparatus into a number of parallel connected units, preferably each of the units being of substantially the same capacity.

It is well known that any electric valve converting apparatus or a system including transformer windings, electric valves, etc., has a certain amount of natural regulation; that is, a certain drop in voltage upon increase in the load current from no load to a full load due to the impedance of the system. In order to compensate for this natural regulation characteristic, electric valve converting systems have been provided with means to tend to increase the average voltage impressed upon the load circuit with increasing load in order to compensate for the natural regulation of the system.

However, in the operation of parallel connected valve devices of the type provided with means for compensating for natural regulation it is found that one or more of the valve devices or converter units has a tendency to assume more than its proportionate share of the total load handled by the electric valve converting system; in fact without some provision there is a tendency for one of the units to carry all of the load. This resulting unbalance in the load produces many undesirable conditions. Not only does it limit the total output of the electric valve converting system but it may seriously endanger the reliable operation of the apparatus besides producing undesirable harmonics and load conditions in the supply circuit of the converting system.

It is an object of my invention, therefore, to overcome the disadvantages above noted in connection with the parallel operation of electric valve devices which are provided with means for compensating for natural regulation.

It is another object of my invention to provide a new and improved electric valve converting system.

It is a further object of my invention to provide a control system for an electric valve converting system which will compel an equal load division among the different units of the converting system.

Still another object of my invention is to provide an electric valve converting system provided with a plurality of parallel connected units each of the type that compensates for natural regulation with means which will compel each of the parallel connected units to assume its proportionate share of the load.

In accordance with the illustrated embodiment of my invention I provide an electric valve converting apparatus for transmitting energy in either direction between direct and alternating current circuits. The electric valve converting apparatus comprises a plurality of multi-valve arc discharge devices, each provided with means for compensating for the natural regulation of the system, and arranged to operate in parallel relationship between the direct and alternating current circuits. The means for compensating for natural regulation comprises impulse transformers having saturating windings through which the direct current is allowed to flow, by which the phase of the grid excitation is varied in accordance with the varying load. In order to insure division of load between the parallel operating units an equalizer bus is provided connecting the saturating windings in parallel relationship so that the phase of the excitation potentials of the control circuits may be varied in exactly the same way on all of the parallel connected units.

The novel features which I believe to be characteristic of my invention are set forth with particularity in the appended claims. My invention itself, however, will best be understood by reference to the following description taken in connection with the accompanying drawing, in which Fig. 1 is a diagrammatic representation of an electric valve converting apparatus to which my invention has been applied; while Fig. 2 is a modification of the embodiment illustrated in Fig. 1.

Figure 2:
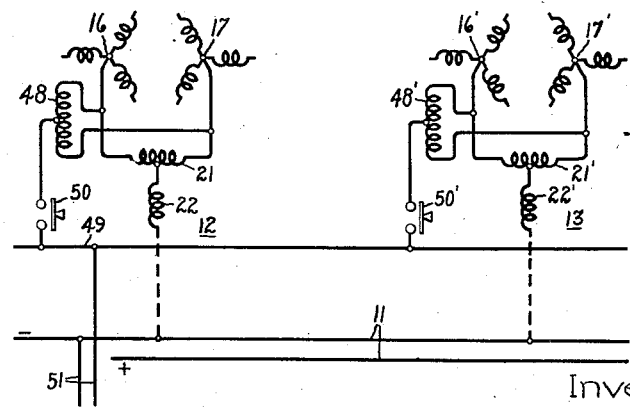

Referring now to Fig. 1 of the drawing I have illustrated therein an electric valve converting apparatus for transmitting energy between a three phase alternating current circuit 10 and a direct current circuit 11. Although my invention is applicable to any of the electric valve converting systems well known in the art, whether converting from direct to alternating current or vice versa, and whether the alternating current circuit is a single phase or polyphase circuit, for simplicity of disclosure I have illustrated an arrangement for transmitting energy between three phase alternating current circuit 10 and direct current circuit 11. Also in order to simplify the following explanation the converting apparatus will be described as transmitting energy from alternating current circuit 10 which will be termed the supply circuit, to direct current circuit 11 which will be termed the load circuit. It will be understood by those skilled in the art that the reverse conditions might equally well be true since the apparatus is readily adaptable for energy transmission in the other direction.

Alternating current supply circuit 10 and direct current load circuit 11 are interconnected by means of a plurality of separate electric valve converter units 12 and 13 operating in parallel relationship. The converter unit 12 comprises a transformer 14 having its primary winding 15 connected to the three phase alternating current supply circuit 10, and a plurality of Y-connected secondary networks 16 and 17 inductively associated with primary winding 15. An electric discharge device 18 is provided with a plurality of substantially independent discharge paths each provided with an anode 19. These anodes 19 are connected, respectively, to the terminals of the Y-connected networks 16 and 17. For simplicity of disclosure only a single one of the terminals of networks 16 and 17 has been illustrated as connected to its respective anode 19, but it will be understood by those skilled in the art that all of the terminals are connected to corresponding anodes. Electric discharge device 18 is also provided with a single pool type cathode 20. The neutral terminals of networks 16 and 17 are interconnected by means of an interphase transformer 21 the midpoint of which is connected through a smoothing reactor 22 to the negative side of direct current circuit 11 through one pole of reversing switch 23 and a plurality of windings 24, 25 and 26, the purpose of which will be hereinafter described. The cathode 20 of electric valve device 18 is connected to the positive side of direct current load circuit 11 through circuit breaker 27 and the other pole of reversing switch 23.

Similarly, converter 13 includes a transformer 14' provided with a primary winding 15' associated with alternating current supply circuit 10 and a plurality of Y-connected secondary networks 16' and 17' having the phase terminals thereof connected to the respective anodes 19' of electric valve device 18' provided with a single pool type cathode 20'. The neutral terminals of secondary networks 16' and 17' are interconnected by means of an interphase transformer 21', the midpoint of which is connected through a smoothing reactor 22' to the negative terminal of the direct current load circuit 11 through reversing switch 23', and a plurality of transformer windings 24', 25' and 26' the purpose of which will be hereinafter described. The cathode 20' is connected to the positive terminal of direct current load circuit 11 through circuit breaker 27' and one pole of reversing switch 23'. It is obvious, therefore, that electric valve converters 12 and 13 are connected in parallel relationship for transmitting energy between three phase alternating current supply circuit 10 and direct current load circuit 11. Although I have described each of the converter units 12 and 13 as provided with multi-anode, single-cathode electric valve devices 18 and 18', respectively, it will be understood by those skilled in the art that these valve devices 18 and 18' might each be replaced by a plurality of separate valves each having an anode, a cathode and a control electrode mounted within a single envelope. Any of the electric valves known to the art may be used, although I prefer to use electric valve devices of the type containing an ionizable gas or a vapor.

Reversing switches 23 and 23' are provided in order to control the direction of energy flow between direct current circuit 11 and alternating current circuit 10, while circuit breakers 27 and 27' are provided in order that one or the other of the converters 12 or 13 may be disconnected when the load is such that only a single unit suffices to transmit the electrical energy between circuits 10 and 11.

In order to control the operation of the converters 12 and 13 each of the electric valve devices 18 and 18' are provided with a plurality of grids or control electrodes 28 and 28', respectively, associated with the anodes 19 and 19'. The control electrodes 28 and 28' are part of suitable control circuits 29 and 29', respectively. Since these control circuits are identical in every respect only the control circuit 29 will be described. The corresponding parts of control circuit 29' will be characterized by the same reference numerals as control circuit 29 except that the reference numerals will be marked with a prime. Control circuit 29 comprises a suitable control transformer 30 upon which control potentials from a suitable source are impressed. This transformer is provided with a primary winding 31 and a secondary winding 32. The control potentials impressed on primary winding 31 of control transformer 30 may be obtained from any suitable source, and as illustrated for rectifier operation, when energy is transmitted from alternating current supply circuit 10 to direct current load circuit 11 primary winding 31 of control transformer 30 may be connected directly to alternating current circuit 10. If on the other hand, energy is being transmitted from direct current 11 to alternating current circuit 10 these control potentials may still be obtained satisfactorily from alternating current circuit 10 if alternating current circuit 10 is connected to an independent source of electromotive force to determine the frequency thereof.

The control potentials from secondary winding 32 are impressed through a suitable rotary phase shifting transformer 33 upon the primary windings 34, 35 and 36 of a plurality of grid transformers having suitable core members 37, 38 and 39, respectively, schematically illustrated in Fig. 1. Inductively associated with primary windings 34, 35 and 36 are secondary windings 40, 41 and 42, respectively, the end terminals of which are suitably connected through current limiting resistors 43 to the control electrodes or grids 28. For simplicity of disclosure only one of the terminals of secondary windings 40, 41 and 42 has been illustrated as connected to its respective control electrode 28, but it will be understood by those skilled in the art that each of the terminals is connected to its respective control electrode or grid 28. The midpoints of secondary windings 40, 41 and 42 of the grid transformers are connected through a suitable bias battery 44 to the cathode 20 of electric valve device 18. The cores 37, 38 and 39 of the grid transformers are preferably of the type arranged to be saturated during a portion of the alternating current cycle so that potentials of peaked wave form may be impressed upon the control electrodes 28 as will be understood by those skilled in the art.

In order to compensate for the natural regulation, that is, the drop in voltage of the rectifier output with increase in load, the grid transformers are provided with saturating windings 24, 25 and 26, respectively, connected in series with one another as well as in series with the midpoint of interphase transformer 21 and the negative terminal of the direct current circuit. These windings 24, 25 and 26 are preferably designed to only partly saturate the cores 37, 38 and 39 of the respective grid transformers. The effect of this partial saturation of cores 37, 38 and 39 by virtue of direct current windings 24, 25 and 26, respectively, is to advance the point in the cycle of the alternating potential of supply circuit 10 at which the resultant fluxes in the saturable cores 37, 38 and 39 of the respective grid transformers reverse polarity, which corresponds to the instants at which peaked impulses are supplied to the secondary windings 40, 41 and 42. In this manner the excitation peaks or impulses impressed on the control electrodes 28 are advanced in phase with increasing load current on the system thus tending to increase the average voltage impressed upon the load circuit 11 and thus compensating for the natural regulation of the system.

In order to prevent converter 12 or 13 from carrying more than its proportionate share of the load, which is very likely among parallel connected converter units provided with means for compensating for natural regulation, I provide equalizer busses 45 and 46 which interconnect respectively the input and output terminals of serially connected saturating windings 24, 25 and 26 of converter 12 with the input and output terminals of serially connected saturating windings 24', 25' and 26' of converter 13 so that these two sets of windings are connected in parallel relation. Equalizer bus 45 interconnects the corresponding terminals of saturating windings 24 and 24' while equalizer bus 46 interconnects the corresponding terminals of saturating windings 26 and 26'. By this arrangement the saturating windings of the converters 12 and 13 are connected in parallel and since they are designed to have the same impedance substantially identical currents will flow through these windings of the respective converters thus insuring that regardless of the load on the converting system each of the converters 12 and 13 will carry its proportionate share of this load. Switches 47 and 47' are provided so that the equalizer busses 45 and 46 may be taken out of operation, it being understood of course that when only one of the converters 12 or 13 is operating these switches will be in the open position.

The operation of the electric valve converting apparatus illustrated in Fig. 1 will be understood by those skilled in the art and only a brief discussion will be included herewith. When energy is transmitted from alternating current circuit 10 to direct current circuit 11 and converters 12 and 13 are operating in parallel, switches 23 and 23' will be in the position indicated in the drawing and circuit breakers 27 and 27' will be in their closed positions. The phase shifting transformers 33 and 33' of the converters 12 and 13 are adjusted so as to produce the desired potential at load circuit 11. The control circuits 29 and 29' will cause excitation potentials of peaked wave form to be impressed on the control electrodes 28 and 28' so as to render the respective anodes 19 and 19' and the associated discharge paths conductive in proper sequence whereby electrical energy will be transmitted through discharge devices 18 and 18' from alternating current supply circuit 10 to direct current load circuit 11. As the load on direct current circuit 11 increases, more current will flow through saturating windings 24, 25, 26 and 24', 25', 26', tending to advance the phase of the grid excitation and thus tending to raise the voltage of direct current circuit 11 which normally would tend to decrease with increasing load due to the impedance of the system. In order to insure an equal load devision between the converters 12 and 13 switches 47 and 47' associated with equalizer busses 45 and 46 are closed so that direct current saturating windings 24, 25 and 26 of the grid transformers of converter 12 are connected in parallel with the direct current saturating windings 24', 25' and 26' of the grid transformers of converter 13 so that the same phase advance or retardation of the grid potential will occur in each of the parallel connected converters 12 and 13. By means of equalizer busses 45 and 46 the direct current flowing through the saturating windings of the grid transformers of converters 12 and 13 are always equal thus preventing one or the other of the converter units from carrying more than its share of the load.

Although I have described the apparatus illustrated in Fig. 1 as operating to transmit energy from alternating current supply circuit 10 to direct current load circuit 11, it will be understood that the system will operate equally well as an inverter in which case reversing switches 23 and 23' are moved to their other positions and direct current circuit 11 becomes the supply circuit while alternating current circuit 10 becomes the load circuit.

In the modification according to Fig. 2 only a portion of the electric valve converting apparatus illustrated in Fig. 1 is shown and the corresponding parts are designated by the same reference numerals. Electric converter apparatus 12 is provided with an equalizer coil 48 connected across interphase transformer 21 while converting apparatus 13 is provided with an equalizer coil 48' connected across interphase transformer 21'. The midpoints of equalizer coils 48 and 48' are interconnected by means of equalizer bus 49 and switches 50 and 50'. By this arrangement the currents flowing through reactors 22 and 22' and from there through the saturating coils of the grid transformers (not shown) are equalized so that each of the converters 12 and 13 will carry its prortionate share of the load. The midtaps of equalizer coils 48 and 48' will be at a positive potential with respect to the negative bus of load circuit 11 due to the potential drop in the interphase transformer by virtue of the load current. Inasmuch as the voltage drop between the midtap of the equalizer coil and the negative load bus is proportional to the load on the rectifier a regulating potential may be obtained across the equalizer bus 49 and the negative bus of load circuit 11, as for example, from the circuit 51 which may be used for energizing the compensating coil of a voltage regulator (not shown). By this arrangement, therefore, not only is the load equalized between converters 12 and 13, but a very simple means is provided for obtaining a potential proportional to the load for energizing the compensating coil of a voltage regulator.

The operation of the modification illustrated in Fig. 2 will be understood by those skilled in the art in view of the detailed description included above with respect to Fig. 1.

While I have described particular embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In an electric valve converting apparatus, a supply circuit, a load circuit, one of said circuits being an alternating current circuit, a plurality of parallel connected electric discharge devices interconnecting said circuits, a control circuit for each of said electric discharge devices of the type in which the phase of the excitation is advanced with increasing load, and means for insuring an equal division of load among said parallel connected electric discharge devices comprising an equalizing bus for equally advancing the phase of the excitation of each of said discharge devices with increasing total load transmitted by said parallel connected electric discharge devices.

2. In an electric valve converting system, a supply circuit, a load circuit, one of said circuits being an alternating current circuit, a plurality of parallel connected arc discharge devices each having a plurality of substantially independent arc paths for transmitting energy between said circuits, a control electrode in each of said arc paths, excitation apparatus comprising a control circuit associated with said electrodes for each of said arc discharge devices including a saturable core transformer for exciting said control electrodes with alternating potentials of peaked wave form, means for variably saturating the cores of said transformer in response to load current of the system so as to regulate the energy transmitted from said supply to said load circuit, and means for equalizing the load on each of said parallel connected arc discharge devices comprising means for equally saturating the cores of all of said transformers.

3. In an electric valve converting system, a supply circuit, a load circuit, one of said circuits being an alternating current circuit, a plurality of parallel connected arc discharge devices for transmitting energy between said circuits, excitation apparatus comprising a control circuit including a saturable core transformer for each of said arc discharge devices, means for energizing said transformers with an alternating potential of the frequency of said alternating current circuit, means for variably saturating the core of said transformers in response to load current of the system so as to regulate the energy transmitted from said supply to said load circuit, and means for insuring an equal division of load among said parallel connected arc discharge devices comprising means for producing an equal saturation of the cores of all of said transformers.

4. In an electric valve converting apparatus, a supply circuit, a load circuit, one of said circuits being an alternating current circuit, a plurality of parallel connected electric discharge devices interconnecting said circuits, a control circuit for each of said electric discharge devices of the type in which the phase of the excitation is advanced with increasing load, and means including a plurality of equalizer coils and an equalizer bus for insuring an equal division of load among said parallel connected discharge devices.

5. In an electric valve converting system, a supply circuit, a load circuit, one of said circuits being an alternating current circuit, a plurality of parallel connected arc discharge devices each having a plurality of substantially independent arc paths for transmitting energy between said circuits, a transformer for each of said parallel connected arc discharge devices comprising a plurality of secondary windings interconnected by means of an interphase transformer, a control electrode in each of said arc paths, excitation apparatus comprising a control circuit associated with said electrodes for each of said arc discharge devices including a saturable core transformer for exciting said control electrodes with alternating potentials of peaked wave form, means for variably saturating the cores of said transformer in response to load current of the system so as to regulate the energy transmitted from said supply to said load circuit, and means including an equalizer coil connected across each of said interphase transformers and an equalizer bus for equalizing the load on each of said parallel connected electric discharge devices so as to equally saturate the cores of all of said transformers.

6. An electrical conversion system comprising two parallel connected arc discharge devices interconnecting a direct current circuit and an alternating current circuit, each of said arc discharge devices having a plurality of substantially independent arc paths, control electrodes associated with each of said arc paths, an impulsing device associated with each of said arc discharge devices for supplying control impulses to the control electrodes of said devices, said impulsing devices comprising saturable core transformers for producing alternating potentials of peaked wave form, means for variably saturating the cores of said transformers in response to current flowing in said direct current circuit of said discharge devices, and means for equalizing the load between said two parallel connected arc discharge devices comprising means for equally saturating the cores of the associated impulse transformers.

7. In an electric valve converting apparatus, a supply circuit, a load circuit, one of said circuits being an alternating current circuit, a plurality of parallel connected electric discharge devices interconnecting said circuits, control electrodes and excitation circuits therefor associated with each of said discharge devices to vary the excitation of said discharge devices in response to the current transmitted thereby between said supply and load circuits, and means for insuring equal load division among said plurality of parallel connected electric discharge devices comprising means for causing each of said excitation circuits to vary the excitation of each of said control electrodes in substantially identical manner.

8. In an electric valve converting apparatus, a supply circuit, a load circuit, one of said circuits being an alternating current circuit, a pair of parallel connected discharge devices each having a control electrode associated therewith for controlling the initiation of discharge, a control circuit associated with each of said control electrodes for controlling the energization thereof including means for impressing a periodic voltage thereon, means for varying the effective phase of the voltage impressed on said control electrodes, and an equalizing connection between the control circuits associated with each of said control members to insure equal load division between said parallel connected electric discharge devices.

9. In an electric valve converting apparatus, a direct current circuit, an alternating current circuit, a pair of parallel connected arc discharge devices each having a control member associated therewith, a control circuit associated with each of said control members and each including a saturable inductive device for impressing on the control member associated therewith a periodic voltage of peaked wave form, a control winding associated with each of said saturable inductive devices for controlling the phase of said periodic voltage, means for energizing said control winding to control the phase of said periodic voltage in response to an electrical condition to be controlled, and means including an equalizing connection between the control windings associated with each of said parallel arc discharge devices for insuring division of load between said parallel connected arc discharge devices.

CARL C. HERSKIND.